US012618521B2

(12) United States Patent
Gupta et al.

(10) Patent No.: US 12,618,521 B2
(45) Date of Patent: May 5, 2026

(54) HYDROGEN FUELING AND STORAGE OPTIMIZATION MODEL

(71) Applicant: Google LLC, Mountain View, CA (US)

(72) Inventors: Dhruv Gupta, San Jose, CA (US); Hariharan Subramanian, Everett, WA (US); Priya Chhiba, Atlanta, GA (US); Varun Sakalkar, Redwood City, CA (US)

(73) Assignee: Google LLC, Mountain View, CA (US)

( * ) Notice: Subject to any disclaimer, the term of this patent is extended or adjusted under 35 U.S.C. 154(b) by 596 days.

(21) Appl. No.: 18/173,902

(22) Filed: Feb. 24, 2023

(65) Prior Publication Data

US 2024/0288122 A1     Aug. 29, 2024

(51) Int. Cl.
*F17C 5/00* (2006.01)
*F17C 13/02* (2006.01)
*G05B 19/4155* (2006.01)

(52) U.S. Cl.
CPC .............. *F17C 5/007* (2013.01); *F17C 13/02* (2013.01); *G05B 19/4155* (2013.01); *F17C 2221/012* (2013.01); *F17C 2250/0408* (2013.01); *F17C 2250/0636* (2013.01); *F17C 2250/0694* (2013.01); *F17C 2265/065* (2013.01); *G05B 2219/45076* (2013.01)

(58) Field of Classification Search
CPC ........ G06Q 10/04; G06Q 50/06; F17C 5/007; F17C 13/02; F17C 2265/065; F17C 2250/0408; F17C 2250/0636; F17C 2221/012; F17C 2250/0694; G05B 19/4155; G05B 2219/45076; Y02E 60/32
See application file for complete search history.

(56) References Cited

U.S. PATENT DOCUMENTS

| | | | |
|---|---|---|---|
| 9,080,529 B1 | 7/2015 | Klughart | |
| 9,347,614 B2 | 5/2016 | Mathison | |
| 10,466,722 B2 * | 11/2019 | Mortensen | ............... F17C 5/06 |
| 10,539,969 B2 * | 1/2020 | Møller | ...................... F17C 5/06 |
| 11,092,652 B2 | 8/2021 | Cottuli | |
| 11,313,514 B2 * | 4/2022 | Mathison | .................. F17C 5/06 |

(Continued)

FOREIGN PATENT DOCUMENTS

| | | |
|---|---|---|
| CN | 101832467 B | 9/2011 |
| CN | 114386839 A | 4/2022 |
| WO | 2022208331 A1 | 10/2022 |

OTHER PUBLICATIONS

Haddad et al. Hydrogen infrastructure: data-center supply-refueling station synergy. Dec. 2017. Vehicle Power and Propulsion Conference, Belfort, France. 7 pages.

(Continued)

*Primary Examiner* — Shogo Sasaki
(74) *Attorney, Agent, or Firm* — Lerner David LLP

(57) ABSTRACT

Aspects of the disclosure are directed to an optimization model for storing liquid hydrogen to power fuel cells in data centers. The optimization model can be based on hydrogen fuel consumption rates in the data center, refueling rates from vendors, refueling response time, storage tank area constraints in the data center, and/or logistical refueling constraints. The optimization model can allow for providing sufficient fuel within a constrained space for backup power in the data center, such as when an emergency arises.

16 Claims, 4 Drawing Sheets

(56) References Cited

U.S. PATENT DOCUMENTS

| | | | |
|---|---|---|---|
| 11,314,304 B2 | 4/2022 | Shaikh et al. | |
| 11,339,926 B2 * | 5/2022 | Mathison | F17C 5/06 |
| 12,430,634 B2 * | 9/2025 | Gaudin | G01C 21/3679 |
| 2005/0103400 A1 * | 5/2005 | Eichelberger | F17C 5/06 |
| | | | 141/95 |
| 2005/0178463 A1 * | 8/2005 | Kountz | F17C 9/02 |
| | | | 141/4 |
| 2008/0000542 A1 * | 1/2008 | Cohen | F17C 13/026 |
| | | | 141/18 |
| 2008/0185068 A1 * | 8/2008 | Cohen | F17C 5/007 |
| | | | 141/94 |
| 2010/0307636 A1 * | 12/2010 | Uemura | F17C 5/06 |
| | | | 141/4 |
| 2022/0197358 A1 | 6/2022 | Gao | |

OTHER PUBLICATIONS

Lazaar et al. Modeling and Control of a Hydrogen-Based Green Data Center. 2021. Elsevier. 59 pages.
Extended European search report for European Appl. No. 23192373.1 dated Feb. 12, 2024. 7 pages.

* cited by examiner

300

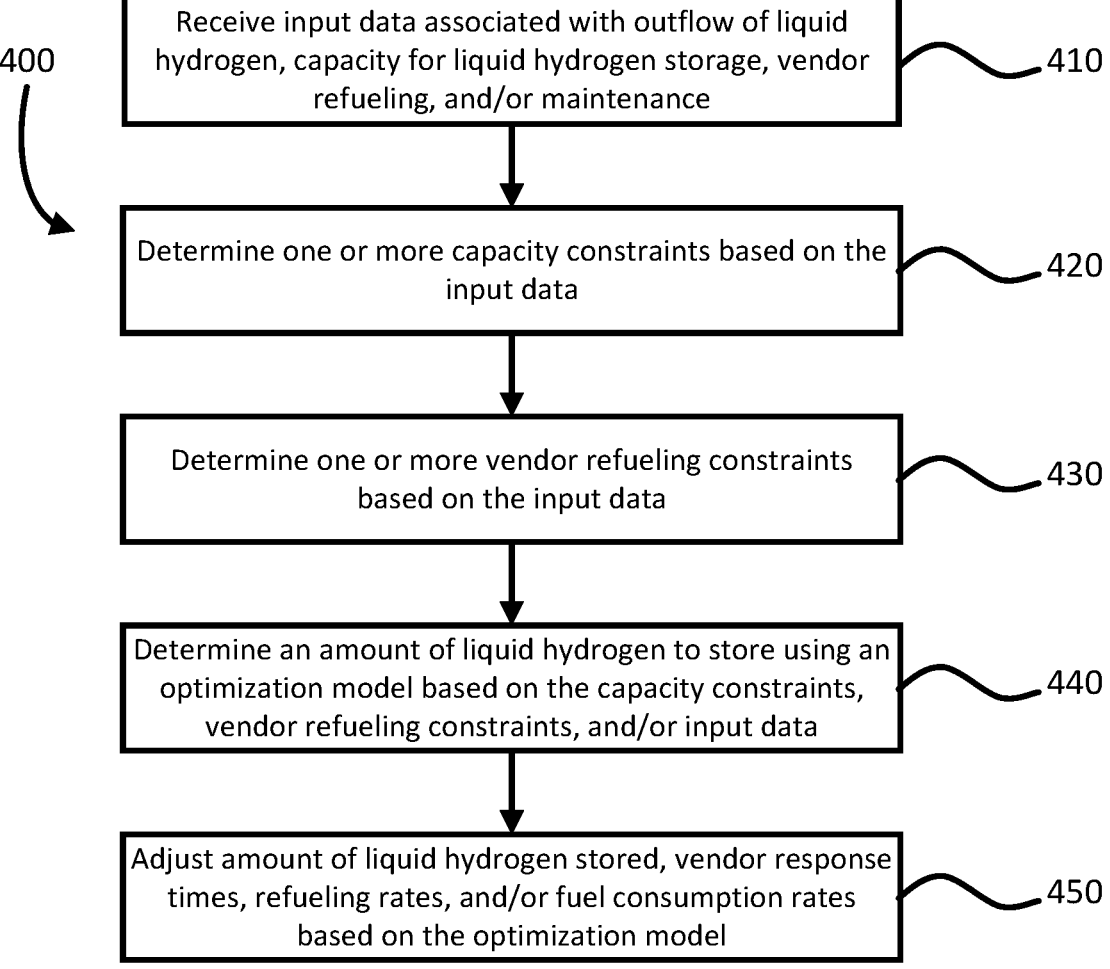

400

Receive input data associated with outflow of liquid hydrogen, capacity for liquid hydrogen storage, vendor refueling, and/or maintenance — 410

Determine one or more capacity constraints based on the input data — 420

Determine one or more vendor refueling constraints based on the input data — 430

Determine an amount of liquid hydrogen to store using an optimization model based on the capacity constraints, vendor refueling constraints, and/or input data — 440

Adjust amount of liquid hydrogen stored, vendor response times, refueling rates, and/or fuel consumption rates based on the optimization model — 450

FIG. 4

HYDROGEN FUELING AND STORAGE OPTIMIZATION MODEL

BACKGROUND

Data centers are facilities that house information technology operations and equipment for an organization and can play a key role in ecommerce, video streaming, government, and various other enterprises. In storing, managing, and disseminating data, data centers consume large amounts of power to operate computers and other associated equipment as well as to operate massive air conditioning units to keep the equipment cool. Utilizing greener energy sources is desirable for consuming such large amounts of power. However, transitioning away from diesel fuels to greener fuels that are less energy dense, such as liquid hydrogen, can create new problems for data centers. Proper sizing of onsite storage of greener fuels can be necessary to deploy cost feasible emergency power backup solutions. For instance, storing too much liquid hydrogen can waste resources while storing too little liquid hydrogen can lead to an inability to keep the data center operating during emergencies.

BRIEF SUMMARY

Aspects of the disclosure are directed to an optimization model for storing liquid hydrogen to power fuel cells in data centers. The optimization model can be based on fuel consumption rates in the data center, refueling rates from vendors, refueling response time, storage tank area constraints in the data center, and/or logistical refueling constraints. The optimization model can allow for providing sufficient fuel within a constrained space for backup power in the data center, such as when an emergency arises.

An aspect of the disclosure provides for a method for controlling liquid hydrogen storage, including: determining, by one or more processors, one or more capacity constraints based on input data associated with a capacity for storing the liquid hydrogen; determining, by the one or more processors, one or more vendor refueling constraints based on input data associated with vendor refueling; determining, by the one or more processors, a minimum amount of liquid hydrogen to store based on the capacity constraints and vendor refueling constraints using an optimization model; and outputting, by the one or more processors, instructions for adjusting liquid hydrogen storage based on the minimum amount of liquid hydrogen to store.

In an example, the method further includes receiving, by the one or more processors, the input data associated with the capacity for storing the liquid hydrogen and the input data associated with vendor refueling.

In another example, the method further includes automatically adjusting, by the one or more processors, an amount of liquid hydrogen capable of being stored based on the instructions. In yet another example, the method further includes automatically adjusting, by the one or more processors, at least one of fuel inflow or fuel outflow based on the instructions.

In yet another example, the optimization model includes at least one of a multi-objective, mixed-integer, linear, or constrained optimization model.

In yet another example, the input data associated with a capacity for storing the liquid hydrogen further includes at least one of a monitored level of liquid hydrogen in a tank at a given time, inflow of liquid hydrogen to the tank, or outflow of liquid hydrogen from the tank. In yet another example, the input data associated with a capacity for storing liquid hydrogen further includes at least one of a fuel minimum level of a tank, a fuel maximum level of a tank, or an area available for containing tanks. In yet another example, the input data associated with vendor refueling further includes at least one of vendor response time, vendor refueling rate, or a maximum number of tanks the vendor can refuel simultaneously.

In yet another example, determining the minimum amount of liquid hydrogen to store is further based on input data associated with maintenance. In yet another example, the input data associated with maintenance further includes at least one of a cost per tank or a cost of liquid hydrogen inventory.

In yet another example, determining the one or more capacity constraints further includes determining at least one of a constraint associated with volume balance, a constraint associated with fuel minimum or maximum levels of a tank, or a constraint associated with a space limit for containing tanks. In yet another example, determining the one or more vendor refueling constraints further includes determining at least one of a constraint associated with inflow based on vendor response time, a constraint associated with inflow based on vendor refueling rate, or a constraint associated with an upper bound based on a number of tanks the vendor can refuel simultaneously.

Another aspect of the disclosure provides for a system including: one or more processors; and one or more storage devices coupled to the one or more processors and storing instructions that, when executed by the one or more processors, cause the one or more processors to perform operations for controlling liquid hydrogen storage. The operations include: determining one or more capacity constraints based on input data associated with a capacity for storing the liquid hydrogen; determining one or more vendor refueling constraints based on input data associated with vendor refueling; determining a minimum amount of liquid hydrogen to store based on the capacity constraints and vendor refueling constraints using an optimization model; and outputting instructions for adjusting liquid hydrogen storage based on the minimum amount of liquid hydrogen to store.

In an example, the operations further include receiving the input data associated with the capacity for storing the liquid hydrogen and the input data associated with vendor refueling.

In another example, the operations further include automatically adjusting an amount of liquid hydrogen capable of being stored based on the instructions. In yet another example, the operations further include automatically adjusting at least one of fuel inflow or fuel outflow based on the instructions.

In yet another example, determining the minimum amount of liquid hydrogen to store is further based on input data associated with maintenance.

In yet another example, determining the one or more capacity constraints further includes determining at least one of a constraint associated with volume balance, a constraint associated with fuel minimum or maximum levels of a tank, or a constraint associated with a space limit for containing tanks. In yet another example, determining the one or more vendor refueling constraints further comprises determining at least one of a constraint associated with inflow based on vendor response time, a constraint associated with inflow based on vendor refueling rate, or a constraint associated with an upper bound based on a number of tanks the vendor can refuel simultaneously.

Yet another aspect of the disclosure provides for a non-transitory computer readable medium for storing instructions that, when executed by one or more processors, cause the one or more processors to perform for controlling liquid hydrogen storage. The operations include: determining one or more capacity constraints based on input data associated with a capacity for storing the liquid hydrogen; determining one or more vendor refueling constraints based on input data associated with vendor refueling; determining a minimum amount of liquid hydrogen to store based on the capacity constraints and vendor refueling constraints using an optimization model; outputting instructions for adjusting liquid hydrogen storage based on the minimum amount of liquid hydrogen to store; and automatically adjusting at least one of an amount of liquid hydrogen capable of being stored, a fuel inflow, or a fuel outflow based on the instructions.

BRIEF DESCRIPTION OF THE DRAWINGS

FIG. 4 depicts a flow diagram of an example process for controlling liquid hydrogen storage to provide to fuel cells according to aspects of the disclosure.

DETAILED DESCRIPTION

Figure 1:
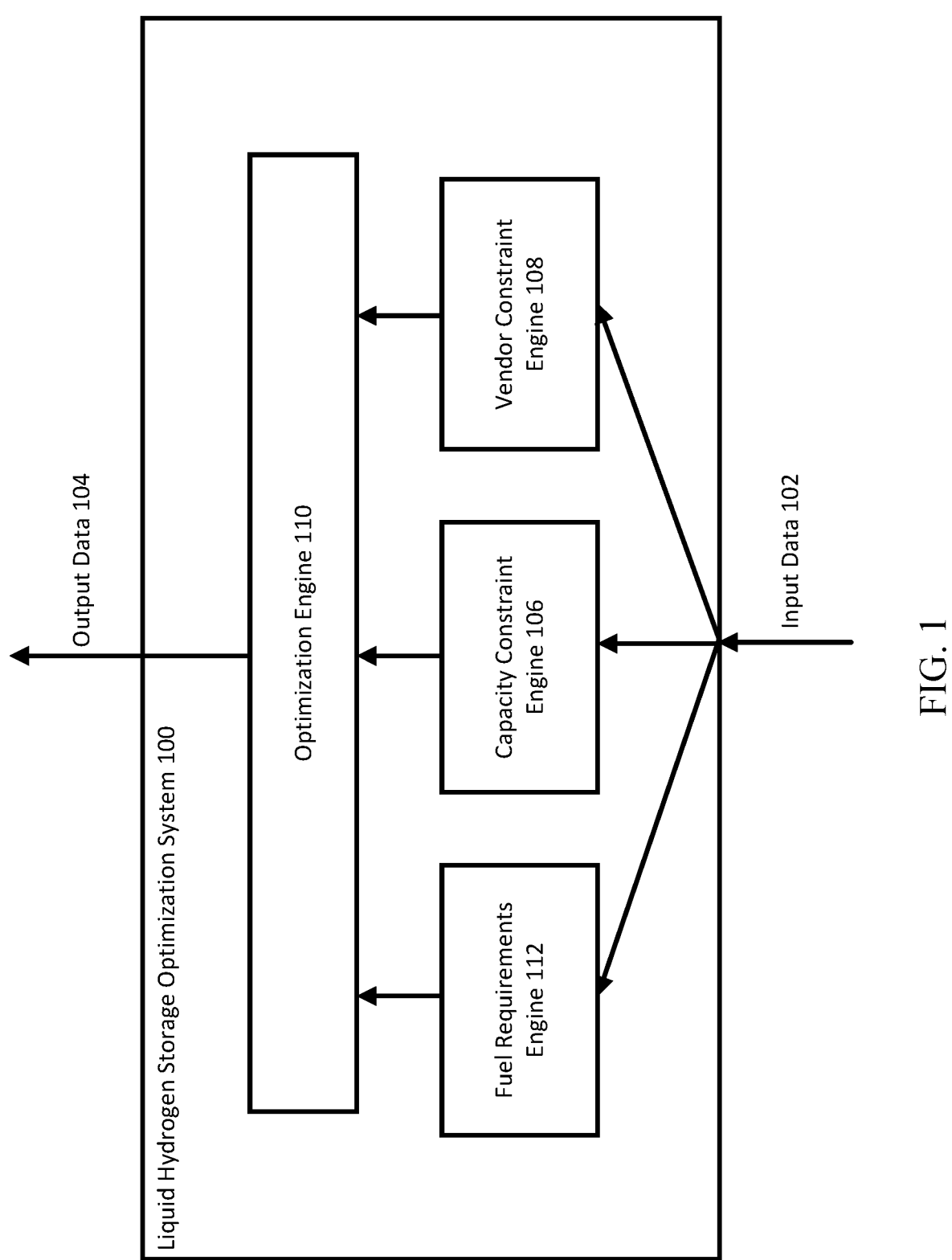
FIG. 1 depicts a block diagram of an example liquid hydrogen storage optimization system according to aspects of the disclosure.

Generally disclosed herein are implementations for optimizing storage of liquid hydrogen for powering fuel cells, such as in a backup power use case in data centers. Optimizing the storage of liquid hydrogen can allow for providing sufficient fuel within a constrained space for backup power in the data center. Optimizing the storage of liquid hydrogen is based on an optimization model that considers fuel consumption rates in the data center, refueling rates from vendors, refueling response time, storage tank area constraints in the data center, and/or logistical refueling constraints. Results of the optimization model can allow for determining an optimal number and/or size of tanks that store the liquid hydrogen, determine an optimal refueling rate and refueling response time. Optimal refueling rates and refueling response times can be used to determine an optimal proximity for a refueling depot as well as determine whether to refuel via vehicle or pipeline.

The optimization model can correspond to a multi-objective, mixed-integer, linear, constrained optimization program. The optimization model can be run on a server computing device configured to receive data related to the tanks that store the liquid hydrogen. The server computing device can receive the data from sensors in the tanks or from a client computing device where the data was input. The data can include liquid hydrogen levels, inflow, and/or outflow of one or more tanks at various times. The amount of liquid hydrogen stored, as well as the outflow of liquid hydrogen, refueling rates and/or refueling response times, can be automatically adjusted based on results of the optimization model. For example, the outflow of liquid hydrogen can be adjusted by reducing an information technology (IT) load to extend backup power duration and prevent sudden and/or complete backup power loss.

The optimization model includes a constraint associated with volume balance. A level of liquid hydrogen in a given tank or a plurality of tanks can be monitored to determine the level of liquid hydrogen at a given time within a backup duration period. As examples, the level of liquid hydrogen in the given tank or plurality of tanks can be determined every hour or half-hour. The inflow and outflow from the given tank or plurality of tanks can also be monitored. The constraint associated with volume balance is based on the level of liquid hydrogen plus inflow minus outflow for each tank. For example, when an emergency arises and liquid hydrogen is used as fuel for fuel cells, the outflow from a given tank can be assigned a value based on an emergency variable. The emergency variable can be a function of time to represent liquid hydrogen consumption in the fuel cell meeting the power need of a variable IT load during the emergency.

The optimization model can further include a constraint associated with a fuel minimum and/or maximum level of a given tank and whether a given tank is present at the data center. Whether a given tank is present can correspond to a binary variable. These constraints can enforce that a fill level of liquid hydrogen in a given tank should be less than a capacity of the given tank but above a dead volume amount of the given tank.

The optimization model can also include a constraint associated with a space limit of the data center. The constraint associated with the space limit can enforce that the number of tanks present at the data center should be less than a total area available for tank installation. The total area available for installation can exclude cryogenic tanks, evaporators, and other auxiliaries needed for converting liquid hydrogen to gaseous hydrogen.

The optimization model further includes one or more constraints associated with vendor refueling. Vendors can correspond to suppliers of fuel for refueling the tanks. The constraints associated with vendor refueling can consider a vendor response time, which can correspond to an earliest time at which a vendor can physically start refueling the tanks, a per tank refueling rate by the vendor, and a maximum number of tanks the vendor can refuel simultaneously. Which tanks are getting refueled at which time can also be monitored, such as by a binary variable. The constraints associated with vendor refueling can enforce an appropriate inflow rate on the tanks from the vendor. For example, a constraint can ensure that the inflow in the tanks is zero for times less than the response time of the vendor. As another example, a constraint can assign an inflow rate to any tanks getting refueled by the vendor. As yet another example, an upper bound constraint can be enforced on a total number of tanks that the vendor can refuel simultaneously. As yet another example, a constraint can ensure that only tanks present at the data center can be refueled.

The optimization model solves a multi-objective function to minimize a number of tanks in the data center and a level of liquid hydrogen kept as inventory in those tanks for emergency purposes. The multi-objective function is based on one or more of the above constraints as well as maintenance costs, such as a cost per tank and a cost of liquid hydrogen inventory. Cost per tank can correspond to a value for building and/or maintaining a tank. Cost of liquid hydrogen inventory can correspond to a value for receiving and/or maintaining liquid hydrogen, such as refrigeration needs to keep the hydrogen in liquid form and periodic safety inspections to ensure the liquid hydrogen is kept properly. Since the maintenance costs can be ongoing, a net present value of the maintenance costs can be represented in the optimization model.

Without enforcing tank physical constraints, the number of tanks and the initial fuel level can be dictated primarily by the vendor response time, since a threshold minimum fuel inventory is needed to support a fuel load until a vendor can refuel onsite. A refueling rate can correspond to an amount of fuel entering a given tank over time and a fuel consumption rate can correspond to an amount of fuel leaving a given tank over time. The refueling rate and the fuel consumption rate can respectively be determined by monitoring the inflow and outflow of a given tank over a period of time. Once refueling starts, if the refueling rate is greater than the fuel consumption rate, then the vendor would be providing liquid hydrogen to power the fuel cells while simultaneously refueling the tanks for future emergencies. Here, the inventory to keep can be solely dependent on initial vendor response time. However, if the vendor has a lower fuel refilling rate and/or limit to the number of tanks that can be refueled simultaneously such that the vendor cannot refuel as fast as the fuel is consumed by the data center, extra inventory will need to be maintained to bridge the gap between consumption and refueling rates such that liquid hydrogen can be supplied to the fuel cells without interruption. Interruption can correspond to running out of liquid hydrogen to be supplied to the fuel cells before or during refueling, which can lead to power loss.

The optimization model can be run with different vendor response times. Based on results of running the optimization model, the number of tanks to include in a data center can be back calculated. The tank physical constraints can then be included to ensure the number of tanks to include is less than or equal to the space limit of the data center. This can ensure the vendor response times are viable for the number of tanks that can fit within a data center.

The optimization model can allow for capacity control, such as determining a minimum number of liquid hydrogen storage tanks required to be installed at a data center site to support emergency backup operations. The optimization model can also allow for revising storage provisioning based on changes in fuel consumption rates in the data center, refueling rates from vendors, refueling response time, storage tank area constraints in the data center, and/or logistical refueling constraints. The optimization model can further allow for manual or automatic real-time control action in the data center by tracking liquid hydrogen fuel usage in real time and adjusting the fuel consumption rate by providing an indication of the emergency load that can be supported with the real-time fuel inventory.

FIG. 1 depicts a block diagram of an example liquid hydrogen storage optimization system 100. The liquid hydrogen storage optimization system 100 can be configured to receive input data 102 via a user interface. For example, the liquid hydrogen storage optimization system 100 can receive the input data 102 as part of a call to an API exposing the liquid hydrogen optimization system 100. The liquid hydrogen optimization system 100 can be implemented on one or more computing devices. Input to the liquid hydrogen optimization system 100 can also be provided through a storage medium, including remote storage connected to the one or more computing devices over a network, or as input through a user interface on a client computing device coupled to the liquid hydrogen optimization system 100. Input to the liquid hydrogen optimization system 100 can also be provided through one or more sensors on tanks that store the liquid hydrogen.

The input data 102 can be associated with an optimization task related to storage of liquid hydrogen and that is performed by an optimization model, such as a multi-objective, mixed-integer, linear, and/or constrained optimization model. Multi-objective optimization can correspond to finding an optimal solution based on multiple goals. Mixed-integer optimization can correspond to finding an optimal solution based on decision variables represented as integer values. Linear optimization can correspond to finding an optimal solution based on requirements represented as linear relationships. Constrained optimization can correspond to finding an optimal solution based on one or more constraints. Constraints can correspond to conditions that the optimal solution must satisfy. The optimization model can be configured to receive any type of input data to generate output data 104 for performing the optimization task related to storage of liquid hydrogen. As examples, the output data 104 can be any kind of score, classification, or regression output based on evaluating the input data 102. Correspondingly, the optimization task can be a scoring, classification, and/or regression task related to storage of liquid hydrogen. The output data 104 can also correspond to decision variable values and/or trend lines.

The input data 102 can include data related to capacity for liquid hydrogen storage. The data related to capacity can include a monitored level of liquid hydrogen in a given tank or a plurality of tanks at a given time. The data related to capacity can further include inflow of liquid hydrogen from the given tank or plurality of tanks. The data related to capacity can also include fuel minimum and/or maximum levels of the given tank or plurality of tanks as well as whether a given tank or plurality of tanks are present at a data center. The data related to capacity can further include a size of a given tank or plurality of tanks and a total area available for tank installation.

The input data 102 can include data related to outflow of liquid hydrogen from a given tank or plurality of tanks. For example, the outflow of liquid hydrogen can be based on an IT load in a data center and a backup energy generation hydrogen consumption efficiency.

The input data 102 can further include data related to vendor refueling. Vendors can correspond to suppliers of fuel for refueling the tanks. The data related to vendor refueling can include vendor response time, which can correspond to an earliest time at which a vendor can physically start refueling the tanks. The data related to vendor refueling can also include a refueling rate per tank by the vendor as well as a maximum number of tanks the vendor can refuel simultaneously. The data related to vendor refueling can further include which tanks are getting refueled at a given time.

The input data 102 can also include data related to maintenance costs, such as a cost per tank and a cost of liquid hydrogen inventory. The cost per tank can correspond to a value for building and/or maintaining a tank. The cost of liquid hydrogen inventory can correspond to a value for receiving and/or maintaining liquid hydrogen, such as refrigeration needs to keep the hydrogen in liquid form and/or periodic safety inspections to ensure the liquid hydrogen is kept properly.

From the input data 102, the liquid hydrogen storage optimization system 100 can be configured to output one or more results related to storage of liquid hydrogen, generated as the output data 104. The output data 104 can include instructions for a minimum number of tanks to store in a data center and/or a level of liquid hydrogen to keep as inventory, such as in the minimum number of tanks, for emergency purposes. The output data 104 can be sent for display on a user display or for automatically adjusting an amount of fuel capable of being stored, e.g., minimum and/or maximum fuel levels, or for automatically adjusting fuel inflow and/or fuel outflow, as examples. In some implementations, the liquid hydrogen storage optimization system 100 can be configured to provide the output data 104 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model.

The liquid hydrogen storage optimization system 100 can be configured to forward the output data 104 to one or more other devices configured for converting the output data 104 into an executable program written in a computer programming language. The liquid hydrogen storage optimization system 100 can also be configured to send the output data 104 to a storage device for storage and later retrieval.

The liquid hydrogen storage optimization system 100 can include a fuel requirements engine 112. The fuel requirements engine 112 can be implemented as one or more computer programs, specially configured electronic circuitry, or any combination of the preceding. The fuel requirements engine 112 can be configured to focus on outflow during an emergency, such as an outflow requirement. The outflow requirement can be received via the input data 102 or indirectly present in the input data 102. If indirectly present in the input data 102, the fuel requirements engine 112 can be configured to determine the outflow requirement from the input data 102. For example, the fuel requirements engine 112 can be configured to determine the outflow requirement based on IT load as a function of time and a backup energy generation hydrogen fuel consumption efficiency.

The liquid hydrogen storage optimization system 100 can include a capacity constraint engine 106. The capacity constraint engine 106 can be implemented as one or more computer programs, specially configured electronic circuitry, or any combination of the preceding. The capacity constraint engine 106 can be configured to determine constraints associated with volume balance, fuel minimum and/or maximum levels, whether a given tank is present at a data center, and/or space available for tank installation. The constraint associated with volume balance can be based on a level of liquid hydrogen plus inflow minus outflow for a given tank or plurality of tanks at a given time. The constraint associated with fuel minimum and/or maximum levels can enforce that a fill level of liquid hydrogen in a given tank should be less than a capacity of the given tank but above a dead volume amount of the given tank. The constraint associated with whether a given tank is present and space available can enforce that a number of tanks present at a data center should be less than a total area available for tank installation.

The liquid hydrogen storage optimization system 100 can further include a vendor constraint engine 108. The vendor constraint engine 108 can be implemented as one or more computer programs, specially configured electronic circuitry, or any combination of the preceding. The vendor constraint engine 108 can be configured to determine one or more constraints associated with vendor refueling to enforce an appropriate inflow rate on the tanks from the vendor. For example, the constraints can ensure that the inflow in the tanks is zero for times less than the response time of the vendor, can assign an inflow rate to any tanks getting refueled by the vendor, can enforce an upper bound on a total number of tanks that the vendor can refuel simultaneously, and can ensure that only tanks present at the data center can be refueled.

The liquid hydrogen storage optimization system 100 can also include an optimization engine 110. The optimization engine 110 can be implemented as one or more computer programs, specially configured electronic circuitry, or any combination of the preceding. The optimization engine 110 can be configured to generate an optimization model that can solve a multi-objective function to minimize an amount of liquid hydrogen to store for emergency purposes based on the constraints from the capacity constraint engine 106 and the vendor constraint engine 108. The multi-objective function can further incorporate maintenance costs, such as the cost per tank and/or cost of liquid hydrogen inventory. Since the maintenance costs can be ongoing, the optimization engine 110 can represent the maintenance costs as a net present value.

Figure 2:
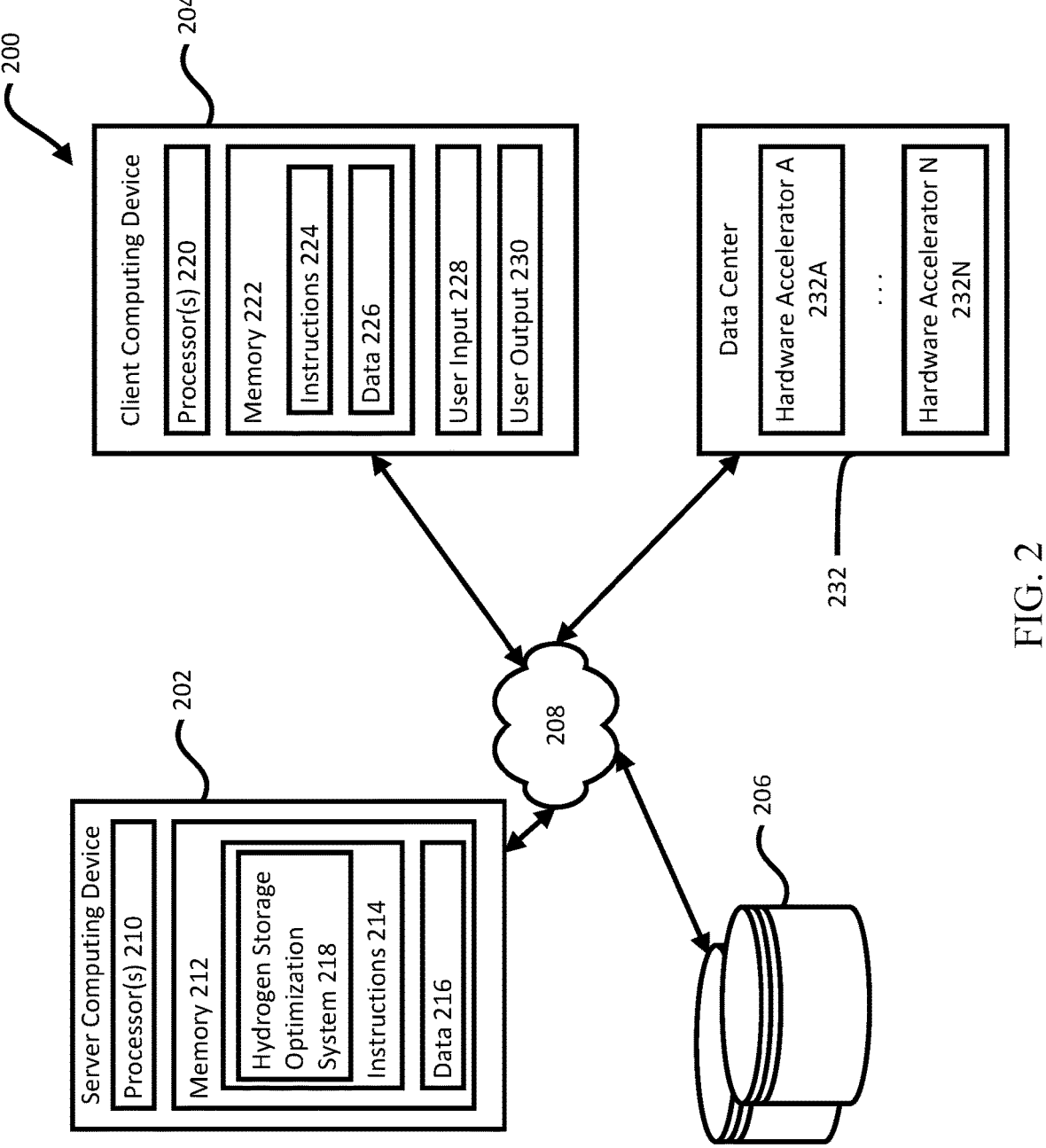
FIG. 2 depicts a block diagram of an example environment for implementing a liquid hydrogen storage optimization system according to aspects of the disclosure.

FIG. 2 depicts a block diagram of an example environment 200 for implementing a liquid hydrogen storage optimization system 218. The liquid hydrogen storage optimization system 218 can be implemented on one or more devices having one or more processors in one or more locations, such as in server computing device 202. Client computing device 204 and the server computing device 202 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 202 can include one or more processors 210 and memory 212. The memory 212 can store information accessible by the processors 210, including instructions 214 that can be executed by the processors 210. The memory 212 can also include data 216 that can be retrieved, manipulated, or stored by the processors 210. The memory 212 can be a type of non-transitory computer readable medium capable of storing information accessible by the processors 210, such as volatile and non-volatile memory. The processors 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that, when executed by the processors 210, cause the one or more processors to perform actions defined by the instructions 214. The instructions 214 can be stored in object code format for direct processing by the processors 210, or in other formats including interpretable scripts or collections of independent source code modules that are interpreted on demand or compiled in advance. The instructions 214 can include instructions for implementing a liquid hydrogen storage optimization system 218, which can correspond to the liquid hydrogen storage optimization system 100 of FIG. 1. The liquid hydrogen storage optimization system 218 can be executed using the processors 210, and/or using other processors remotely located from the server computing device 202.

The data 216 can be retrieved, stored, or modified by the processors 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII, or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 220, memory 222, instructions 224, and data 226. The client computing device 204 can also include a user input 228 and a user output 230. The user input 228 can include any appropriate mechanism or technique for receiving input from a user, such as keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 230. The user output 230 can also be used for displaying an interface between the client computing device 204 and the server computing device 202. The user output 230 can alternatively or additionally include one or more speakers, transducers or other audio outputs, a haptic interface or other tactile feedback that provides non-visual and non-audible information to the platform user of the client computing device 204.

Although FIG. 2 illustrates the processors 210, 220 and the memories 212, 222 as being within the computing devices 202, 204, components described herein can include multiple processors and memories that can operate in different physical locations and not within the same computing device. For example, some of the instructions 214, 224 and the data 216, 226 can be stored on a removable SD card and others within a read-only computer chip. Some or all of the instructions and data can be stored in a location physically remote from, yet still accessible by, the processors 210, 220. Similarly, the processors 210, 220 can include a collection of processors that can perform concurrent and/or sequential operation. The computing devices 202, 204 can each include one or more internal clocks providing timing information, which can be used for time measurement for operations and programs run by the computing devices 202, 204.

The server computing device 202 can be connected over the network 208 to a data center 232 housing any number of hardware accelerators 232A-N. The data center 232 can be one of multiple data centers or other facilities in which various types of computing devices, such as hardware accelerators, are located. Computing resources housed in the data center 232 can be specified for deploying optimization models for related to liquid hydrogen storage as described herein.

The server computing device 202 can be configured to receive requests to process data from the client computing device 204 on computing resources in the data center 232. For example, the environment 200 can be part of a computing platform configured to provide a variety of services to users, through various user interfaces and/or application programming interfaces (APIs) exposing the platform services. The variety of services can include generating one or more optimization models related to liquid hydrogen storage. The client computing device 204 can transmit input data associated with capacity for liquid hydrogen storage, vendor refueling, and/or maintenance costs. The liquid hydrogen storage optimization system 218 can receive the input data, and in response, generate output data including a minimum amount of liquid hydrogen to store for emergency purposes.

As other examples of potential services provided by a platform implementing the environment 200, the server computing device 202 can maintain a variety of optimization models in accordance with different constraints available at the data center 232. For example, the server computing device 202 can maintain different families for deploying optimization models on various types of TPUs and/or GPUs housed in the data center 232 or otherwise available for processing.

Figure 3:
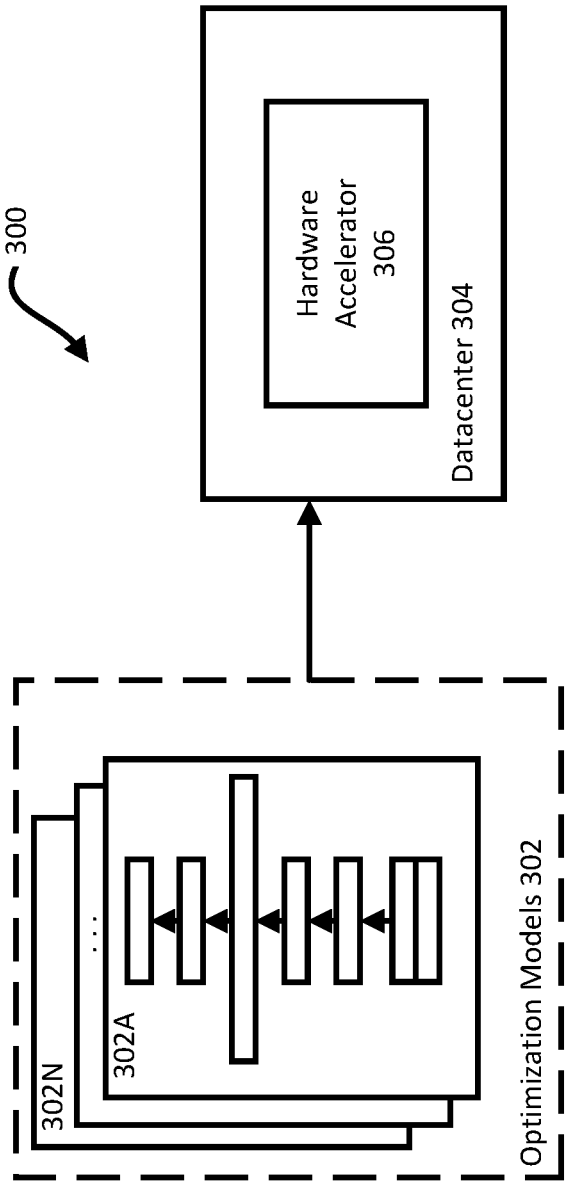
FIG. 3 depicts a block diagram illustrating one or more optimization model architectures according to aspects of the disclosure.

FIG. 3 depicts a block diagram 300 illustrating one or more optimization model architectures 302, more specifically 302A-N for each architecture, for deployment in a data center 304 housing a hardware accelerator 306 on which the deployed optimization models 302 will execute for providing minimum amounts of liquid hydrogen to store on site at a data center. The hardware accelerator 306 can be any type of processor, such as a CPU, GPU, FPGA, or ASIC such as a TPU.

An architecture 302 of an optimization model can refer to characteristics defining the model, such as characteristics of layers for the model, how the layers process input, or how the layers interact with one another. For example, the optimization model can correspond to a multi-objective, mixed-integer, linear, constrained optimization program. The architecture 302 of the optimization model can also define types of operations performed within each layer. One or more optimization model architectures 302 can be generated that can output minimum amounts of liquid hydrogen to store based on one or more constraints. Further, the optimization can be executed in an iterative manner to obtain a sensitivity of the hydrogen storage requirement as a function of the input data.

Referring back to FIG. 2, the devices 202, 204 and the data center 232 can be capable of direct and indirect communication over the network 208. For example, using a network socket, the client computing device 204 can connect to a service operating in the data center 232 through an Internet protocol. The devices 202, 204 can set up listening sockets that may accept an initiating connection for sending and receiving information. The network 208 itself can include various configurations and protocols including the Internet, World Wide Web, intranets, virtual private networks, wide area networks, local networks, and private networks using communication protocols proprietary to one or more companies. The network 208 can support a variety of short- and long-range connections. The short- and long-range connections may be made over different bandwidths, such as 2.402 GHz to 2.480 GHZ, commonly associated with the Bluetooth® standard, 2.4 GHz and 5 GHz, commonly associated with the Wi-Fi® communication protocol; or with a variety of communication standards, such as the LTE® standard for wireless broadband communication. The network 208, in addition or alternatively, can also support wired connections between the devices 202, 204 and the data center 232, including over various types of Ethernet connection.

Although a single server computing device 202, client computing device 204, and data center 232 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing optimization models, and any combination thereof.

FIG. 4 depicts a flow diagram of an example process 400 for controlling liquid hydrogen storage to provide to fuel cells, such as for emergency power. The example process 400 can be performed on a system of one or more processors in one or more locations, such as the liquid hydrogen storage optimization system 100 of FIG. 1.

As shown in block 410, the liquid hydrogen storage optimization engine 100 can receive input data. The input data can include data associated with outflow of liquid hydrogen, capacity for liquid hydrogen storage, data associated with vendor refueling, and/or data associated with maintenance. The data associated with outflow of liquid hydrogen can be based on an IT load in a data center and a backup energy generation hydrogen consumption efficiency. The data associated with capacity can include a monitored level of liquid hydrogen in a given tank or a plurality of tanks at a given time, inflow of liquid hydrogen from the given tank or plurality of tanks, fuel minimum and/or maximum levels of the given tank or plurality of tanks, whether a given tank or plurality of tanks are present at a data center, and/or a size of a given tank or plurality of tanks and a total area available for tank installation. The data associated with vendor refueling can include vendor response time, a refueling rate per tank by the vendor, a maximum number of tanks the vendor can refuel simultaneously, and/or which tanks are getting refueled at a given time. The data associated with maintenance can include cost per tank and/or cost of liquid hydrogen inventory.

As shown in block 420, the capacity constraint engine can determine one or more capacity constraints based on the input data, such as the data associated with capacity for liquid hydrogen storage.

The capacity constraints can include a constraint associated with volume balance. A level of liquid hydrogen in a given tank or a plurality of tanks can be monitored to determine the level of liquid hydrogen at a given time within a backup duration period. As examples, the level of liquid hydrogen in the given tank or plurality of tanks can be determined every hour or half-hour. The inflow and outflow from the given tank or plurality of tanks can also be monitored. The constraint associated with volume balance can be based on the level of liquid hydrogen plus inflow minus outflow for each tank. For example, the constraint associated with volume balance can be represented as:

$$L_{i,(t+1)} = L_{i,t} + I_{i,t} - O_{i,t} \forall i, t \in \{0, T-1\} \tag{1}$$

Here, all uppercase English (Latin) letters denote variables, lower case English (Latin) letters are indices, and Greek letters denote parameters. All variables can be either non-negative or can be binary. The level of liquid hydrogen in a tank i at time t can be denoted with the variable $L_{i,t}$ and the inflow and outflow from the tank can be denoted with variables $l_{i,t}$ and $O_{i,t}$, respectively. The index i can be for tanks with values 1, 2, 3 . . . N, where N is the upper bound on the number of tanks considered for optimization and the index t can be for time, which can be denoted hourly, as 0, 1, 2, . . . T hours, where T can be 24 hours to match a backup duration requirement.

The capacity constraints can further include a constraint associated with a fuel minimum and/or maximum level of a given tank and whether a given tank is present at a data center. These constraints can enforce that a fill level of liquid hydrogen in a given tank should be less than a capacity of the given tank but above a dead volume amount of the given tank as well as keep track of whether a tank is present or not. For example, these constraints can be represented as:

$$X_i \varepsilon_L \le L_{i,(t=0)} \le X_i \beta_L \forall i \tag{2}$$

Here, $X_i$ can be a binary variable to represent whether a tank is present onsite, e.g., at a data center, or not. $\varepsilon_L$ can be a small number, such as 1 cubic meter, and $\beta_L$ can be a standard tank size a vendor can offer.

The capacity constraints can further include constraints to bound the inflow and outflow of the tanks to ensure that the inflow and outflow variables can only be active when the corresponding tanks are present. $\varepsilon_I$ and $\varepsilon_O$ can be small numbers, such as 1 cubic meter per minute, or even take the value of zero, and $\beta_I$ and $\beta_O$ can be the upper bounds on the inflow and outflow rates to and from the tanks, respectively. $\tau$ can be a parameter associated with the vendor constraint engine and is described further below.

$$X_i \varepsilon_I \le 1_{i,t} \le X_i \beta_I \forall i, t \ge \tau \tag{3}$$

$$X_i \varepsilon_O \le O_{i,t} \le X_i \beta_O \forall i, t \tag{4}$$

The capacity constraints can further include a constraint associated with a space limit of the data center. The constraint associated with the space limit can enforce that the number of tanks present at the data center should be less than a total area available for tank installation. The total area available for installation can exclude cryogenic tanks, evaporators, and other auxiliaries needed for converting liquid hydrogen to gaseous hydrogen. For example, the constraint associated with a space limit can be represented as:

$$\alpha \sum_i X_i \le \gamma \tag{5}$$

Here, $\alpha$ can be the area occupied by a single tank and $\gamma$ can be the total area available for tank installation.

When an emergency arises and liquid hydrogen is used as fuel for fuel cells, the outflow from a given tank can be assigned a value based on an emergency variable. The emergency variable can be a function of time to represent liquid hydrogen consumption in the fuel cell meeting the power need of a variable IT load during the emergency. This can be associated with the outflow requirement determined by the fuel requirements engine 112. For example, this can be represented as:

$$\sum_i O_{i,t} = \zeta_t \forall t \tag{6}$$

Here, $\zeta_t$ can be the emergency variable. This constraint can ensure that the sum of outflow from the tanks satisfies the total outflow requirement, e.g., the total fuel requirement of a backup power generation system.

As shown in block 430, the vendor constraint engine can determine one or more vendor refueling constraints based on the input data, such as the data associated with vendor refueling. The constraints associated with vendor refueling can consider a vendor response time, which can be denoted as $\tau$, a per tank refueling rate by the vendor, which can be denoted as $\lambda$, and a maximum number of tanks the vendor can refuel simultaneously, which can be denoted as $\eta$. Which tanks are getting refueled at which time can also be monitored and can be denoted by a binary variable $Y_{i,t}$. The constraints associated with vendor refueling can enforce an appropriate inflow rate on the tanks from the vendor. For example, a constraint can ensure that the inflow in the tanks is zero for times less than the response time of the vendor. This constraint can be represented as:

$$I_{i,t} = 0 \; \forall \; i, t < \tau \qquad (7)$$

As another example, a constraint can assign an upper bound on the inflow rate to any tanks getting refueled by the vendor. This constraint can be represented as:

$$I_{i,t} \le \lambda Y_{i,t} \; \forall \; i, t \ge \tau \qquad (8)$$

As yet another example, an upper bound constraint can be enforced on a total number of tanks that the vendor can refuel simultaneously. This constraint can be represented as:

$$\sum_i Y_{i,t} \le \eta \; \forall \; t \qquad (9)$$

As yet another example, a constraint can ensure that only tanks present at the data center can be refueled. This constraint can be represented as:

$$Y_{i,t} \le X_i \; \forall \; i, t \qquad (10)$$

As shown in block 440, the optimization engine can determine an amount of liquid hydrogen to store onsite based on the capacity constraints, vendor refueling constraints, and/or input data. The optimization engine can use an optimization model to determine the amount of liquid hydrogen to store. The optimization model can correspond to a multi-objective, mixed-integer, linear, constrained optimization program. The optimization model can be run iteratively. The optimization model can solve a multi-objective function to minimize a number of tanks in the data center and a level of liquid hydrogen kept as inventory in those tanks for emergency purposes. The multi-objective function can be based on one or more of the above constraints as well as maintenance costs, such as a cost per tank and a cost of liquid hydrogen inventory. For example, the multi-objective function can be represented as:

$$\sum_i \mu X_i + \sum_i \nu L_{i,(t=0)} \qquad (11)$$

$\mu$ can denote the cost per tank and $\nu$ can denote the cost of liquid hydrogen inventory.

Without considering physical refueling constraints of the tanks, the vendor response time can generally determine the number of tanks and the initial fuel level. A threshold minimum fuel inventory is required to support fuel load until a vendor can refuel onsite.

A refueling rate can correspond to an amount of fuel entering a given tank over time and a fuel consumption rate can correspond to an amount of fuel leaving a given tank over time. Monitoring the inflow and outflow of a given tank over a period of time can determine the refueling rate and the fuel consumption rate, respectively. Once a vendor can initiate refueling, if the refueling rate is greater than the fuel consumption rate, then the vendor would be providing liquid hydrogen to power the fuel cells while simultaneously refueling the tanks for future emergencies. Here, the level of liquid hydrogen to keep as inventory can be based on initial vendor response time. However, if the vendor has a lower fuel refueling rate and/or limit to the number of tanks that can be refueled simultaneously such that the vendor cannot refuel as fast as the fuel is consumed by the data center, the data center will need to keep as inventory an increased level of liquid hydrogen such that the tanks can supply liquid hydrogen to the fuel cells without interruption, which can lead to power loss if, for example, the liquid hydrogen runs out before or during refueling.

The optimization model can be run with different vendor response times. Based on results of running the optimization model, the optimization engine can back calculate the amount of liquid hydrogen to store, such as the number of tanks to include in a data center. The optimization engine can then consider the tank physical constraints to ensure the number of tanks to include is less than or equal to the space limit of the data center. This can ensure the vendor response times are viable for the number of tanks that can fit within a data center.

As shown in block 450, the optimization engine can adjust the amount of liquid hydrogen stored, as well as the outflow of liquid hydrogen, refueling rates and/or refueling response times based on results of the optimization model. For example, the optimization engine can adjust the outflow of liquid hydrogen by reducing an IT load to extend backup power duration and prevent sudden and/or complete backup power loss. The adjustment can be automatically performed as the optimization engine is run.

As such, generally disclosed herein are implementations for optimizing storage of liquid hydrogen for powering fuel cells, such as in a backup power use case in data centers. Optimizing the storage of liquid hydrogen can allow for capacity control, such as determining a minimum number of liquid hydrogen storage tanks required to be installed at a data center site to support emergency backup operations. Optimizing the storage can also allow for revising storage provisioning based on changes in fuel consumption rates in the data center, refueling rates from vendors, refueling response time, storage tank area constraints in the data center, and/or logistical refueling constraints. Optimizing the storage can further allow for manual or automatic real-time control action in the data center by tracking liquid hydrogen fuel usage in real time and adjusting the fuel consumption rate by providing an indication of the emergency load that can be supported with the real-time fuel inventory.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling liquid hydrogen storage, comprising:

determining, by one or more processors, one or more capacity constraints based on input data associated with a capacity for storing liquid hydrogen;

determining, by the one or more processors, one or more vendor refueling constraints based on input data associated with vendor refueling;

determining, by the one or more processors, a minimum amount of liquid hydrogen to store based on the one or more capacity constraints and the one or more vendor refueling constraints using an optimization model;

outputting, by the one or more processors, instructions for adjusting liquid hydrogen storage based on the minimum amount of liquid hydrogen to store; and automatically adjusting, by the one or more processors, at least one of an amount of liquid hydrogen capable of being stored, fuel inflow, or fuel outflow based on the instructions.

2. The method of claim 1, further comprising receiving, by the one or more processors, the input data associated with the capacity for storing the liquid hydrogen and the input data associated with vendor refueling.

3. The method of claim 1, wherein the optimization model comprises at least one of a multi-objective, mixed-integer, linear, or constrained optimization model.

4. The method of claim 1, wherein the input data associated with a capacity for storing the liquid hydrogen further comprises at least one of a monitored level of liquid hydrogen in a tank at a given time, inflow of liquid hydrogen to the tank, or outflow of liquid hydrogen from the tank.

5. The method of claim 1, wherein the input data associated with a capacity for storing liquid hydrogen further comprises at least one of a fuel minimum level of a tank, a fuel maximum level of a tank, or an area available for containing tanks.

6. The method of claim 1, wherein the input data associated with vendor refueling further comprises at least one of vendor response time, vendor refueling rate, or a maximum number of tanks the vendor can refuel simultaneously.

7. The method of claim 1, wherein determining the minimum amount of liquid hydrogen to store is further based on input data associated with maintenance.

8. The method of claim 7, wherein the input data associated with maintenance further comprises at least one of a cost per tank or a cost of liquid hydrogen inventory.

9. The method of claim 1, wherein determining the one or more capacity constraints further comprises determining at least one of a constraint associated with volume balance, a constraint associated with fuel minimum or maximum levels of a tank, or a constraint associated with a space limit for containing tanks.

10. The method of claim 1, wherein determining the one or more vendor refueling constraints further comprises determining at least one of a constraint associated with inflow based on vendor response time, a constraint associated with inflow based on vendor refueling rate, or a constraint associated with an upper bound based on a number of tanks the vendor can refuel simultaneously.

11. A system comprising:

one or more processors; and one or more storage devices coupled to the one or more processors and storing instructions that, when executed by the one or more processors, cause the one or more processors to perform operations for controlling liquid hydrogen storage, the operations comprising:

determining one or more capacity constraints based on input data associated with a capacity for storing liquid hydrogen;

determining one or more vendor refueling constraints based on input data associated with vendor refueling;

determining a minimum amount of liquid hydrogen to store based on the one or more capacity constraints and the one or more vendor refueling constraints using an optimization model;

outputting instructions for adjusting liquid hydrogen storage based on the minimum amount of liquid hydrogen to store; and automatically adjusting at least one of an amount of liquid hydrogen capable of being stored, fuel inflow, or fuel outflow based on the minimum amount of liquid hydrogen to store.

12. The system of claim 11, wherein the operations further comprise receiving the input data associated with the capacity for storing the liquid hydrogen and the input data associated with vendor refueling.

13. The system of claim 11, wherein determining the minimum amount of liquid hydrogen to store is further based on input data associated with maintenance.

14. The system of claim 11, wherein determining the one or more capacity constraints further comprises determining at least one of a constraint associated with volume balance, a constraint associated with fuel minimum or maximum levels of a tank, or a constraint associated with a space limit for containing tanks.

15. The system of claim 11, wherein determining the one or more vendor refueling constraints further comprises determining at least one of a constraint associated with inflow based on vendor response time, a constraint associated with inflow based on vendor refueling rate, or a constraint associated with an upper bound based on a number of tanks the vendor can refuel simultaneously.

16. A non-transitory computer readable medium for storing instructions that, when executed by one or more processors, cause the one or more processors to perform operations for controlling liquid hydrogen storage, the operations comprising:

determining one or more capacity constraints based on input data associated with a capacity for storing liquid hydrogen;

determining one or more vendor refueling constraints based on input data associated with vendor refueling;

determining a minimum amount of liquid hydrogen to store based on the one or more capacity constraints and the one or more vendor refueling constraints using an optimization model;

outputting instructions for adjusting liquid hydrogen storage based on the minimum amount of liquid hydrogen to store; and automatically adjusting at least one of an amount of liquid hydrogen capable of being stored, a fuel inflow, or a fuel outflow based on the instructions.

\* \* \* \* \*